No. 32,054.　　　　　　　　　　　　　　　PATENTED APR. 16, 1861.
W. DECKMANN.
HAY RAKE.

Witnesses:
T. H. Alexander
Wm. Myles

Inventor:
William Deckmann

UNITED STATES PATENT OFFICE.

WILLIAM DECKMANN, OF CANTON, OHIO.

HAY-RAKE.

Specification of Letters Patent No. 32,054, dated April 16, 1861.

*To all whom it may concern:*

Be it known that I, WILLIAM DECKMANN, of Canton, in the county of Stark and State of Ohio, have invented certain new and useful Improvements in Hay-Rakes; and I do hereby declare that the following is a full, clear, and exact description of the same, reference being had to the accompanying drawings and to the letters of reference marked thereon, in which—

Figure 1:
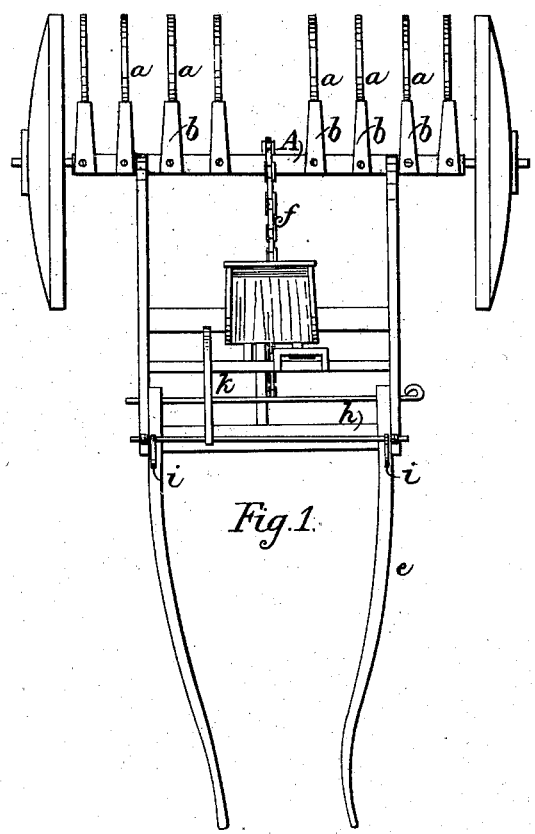
Figure 2:
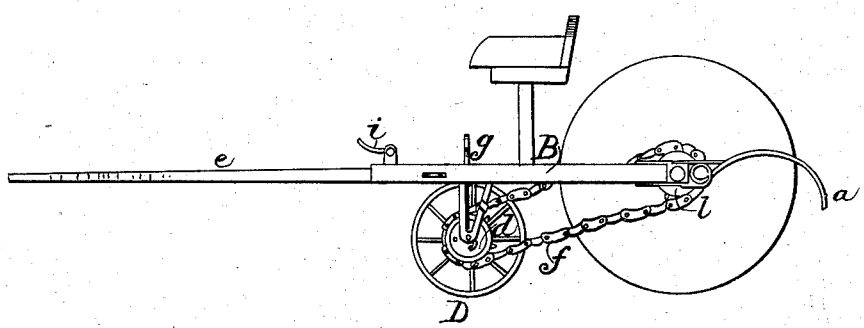

Figure 1 represents a plan view, and Fig. 2 a longitudinal section.

The nature of my invention consists in the employment and arrangement of certain devices the peculiarities of which will be hereinafter fully set forth.

To enable others skilled in the art to make and use my invention I will now describe its construction and operation.

(A) represents the rake beam or axle, which is designed either to revolve or to remain stationary as is preferred.

(B) is a frame, which is connected to the axle by means of metal loops passing around it in grooves, thus allowing it to revolve when necessary.

(C) represents the shafts secured to the frame (B), as fully shown in Fig. 1.

(*a a*) are the rake teeth. Each one of said teeth should be twisted into a circle, just below the point where it enters the rake beam, for the purpose of giving it greater elasticity and strength. This feature is shown in Fig. 2.

(*b b*) represent springs secured to the rake beam at the back of the teeth (*a a*), thus imparting a firm brace to them.

(D) represents a driving wheel. Said wheel is provided with cogs around its axis.

(*d*) is a clutch which slides upon the axle of the wheel (D). Clutch (*d*) is provided around its circumference with little pins placed at regular intervals. Directly opposite said clutch upon the rake beam is secured a small wheel, likewise provided with little pins or projections.

(*f*) represents an endless chain, so constructed that every other link will be double, thus bringing the spaces between these links over the projections on clutch (*d*) and wheel (*e*).

(*g*) represents a lever, which is placed on the outer side of clutch (*d*) for the purpose of throwing the machine in and out of gear, as will be more fully seen hereafter.

(*h*) is a rod extending across the front part of the frame (B). Just over the shafts (*i i*) are two small levers, secured rigidly to said rod.

(*k*) is also a lever secured to the same rod. The object of this arrangement is to elevate the front part of the machine when necessary.

The operation of my invention is as follows: The clutch (*d*) is thrown out of gear by means of lever (*g*) and the driving wheel (D) elevated off the ground. The machine is then put in motion. When the rake has collected a sufficient quantity of hay the clutch is thrown in gear and the lever (*k*) pushed forward, which lets the driving wheel down. The rake beam is instantly revolved and the hay deposited together, which as soon as done the machine is again thrown out of gear and the driving wheel elevated. Thus the operation is renewed until the work is all performed.

Having thus fully described my invention, what I claim and desire to secure by Letters Patent is—

The employment of driving wheel (D) and its accompanying mechanism in combination with levers (*k*) and (*i i*) on rod (*h*), all arranged as and for the purpose specified.

WILLIAM DECKMANN.

Witnesses:
DANIEL GOTSHALL,
TOM H. HAYS.